US010555223B2

(12) United States Patent
Mustajärvi et al.

(10) Patent No.: US 10,555,223 B2
(45) Date of Patent: Feb. 4, 2020

(54) METHOD AND APPARATUS FOR PROVIDING AN INDICATION REGARDING IP ADDRESS PRESERVATION FOLLOWING A TRANSFER INVOLVING A WIRELESS LOCAL AREA NETWORK

(71) Applicant: Nokia Technologies Oy, Espoo (FI)

(72) Inventors: Jari Mustajärvi, Espoo (FI); Janne Tervonen, Espoo (FI); Janne Marin, Espoo (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/556,407

(22) PCT Filed: Mar. 9, 2015

(86) PCT No.: PCT/IB2015/051714
§ 371 (c)(1),
(2) Date: Sep. 7, 2017

(87) PCT Pub. No.: WO2016/142742
PCT Pub. Date: Sep. 15, 2016

(65) Prior Publication Data
US 2018/0109979 A1 Apr. 19, 2018

(51) Int. Cl.
H04W 36/00 (2009.01)
H04W 36/14 (2009.01)
(Continued)

(52) U.S. Cl.
CPC ....... H04W 36/0022 (2013.01); H04W 8/082 (2013.01); H04W 36/0061 (2013.01);
(Continued)

(58) Field of Classification Search
CPC ............. H04W 36/0022; H04W 36/14; H04W 36/0061; H04W 8/082; H04W 8/26; H04W 48/08
See application file for complete search history.

(56) References Cited

U.S. PATENT DOCUMENTS

2009/0270117 A1* 10/2009 Buckley .............. H04L 12/5692
455/515
2011/0051689 A1 3/2011 Premec et al.
(Continued)

FOREIGN PATENT DOCUMENTS

CN 101150838 A 3/2008
CN 101594609 A 12/2009
(Continued)

OTHER PUBLICATIONS

"3rd Generation Partnership Project; Technical Specification Group Services and System Aspects; Architecture enhancements for non-3GPP accesses (Release 13)", 3GPP TS 23.402, V13.0.0, Dec. 2014, pp. 1-290.
(Continued)

Primary Examiner — Rina C Pancholi
(74) Attorney, Agent, or Firm — Alston & Bird LLP

(57) ABSTRACT

A method, apparatus and computer program product are provided to facilitate the transition of user equipment between basic service sets within a WLAN or from a basic service set within a WLAN to a cellular data link of a cellular network. In the context of a method from the perspective of the user equipment, a message is received that identifies one or more basic service sets or cellular data links to which user equipment is potentially capable of transferring. For each basic set or cellular data link, the method includes determining from the message whether the respective basic service set or cellular data link is a candidate to permit an internet protocol (IP) address of the user equip-
(Continued)

ment to be preserved following the transfer. The method includes an indication associated with each respective basic service set or cellular data link to identify whether the IP address of the user equipment is able to be preserved following the transfer thereto.

14 Claims, 5 Drawing Sheets

(51) Int. Cl.
 *H04W 8/08* (2009.01)
 *H04W 48/08* (2009.01)
 *H04W 8/26* (2009.01)
(52) U.S. Cl.
 CPC .............. *H04W 36/14* (2013.01); *H04W 8/26* (2013.01); *H04W 48/08* (2013.01)

(56) References Cited

U.S. PATENT DOCUMENTS

| | | | | |
|---|---|---|---|---|
| 2013/0010756 A1* | 1/2013 | Liang | .................... | H04W 36/18 370/331 |
| 2013/0336287 A1* | 12/2013 | Abraham | .......... | H04W 36/0061 370/331 |
| 2014/0044098 A1* | 2/2014 | Roeland | ................ | H04W 76/12 370/331 |
| 2015/0020168 A1* | 1/2015 | Faccin | .................. | H04W 12/06 726/4 |

FOREIGN PATENT DOCUMENTS

| | | | | |
|---|---|---|---|---|
| EP | 2112786 | | 12/2011 | |
| EP | 2804426 | | 11/2014 | |
| EP | 2804426 A1 | * | 11/2014 | ............ H04W 24/02 |
| WO | 2014056983 | | 4/2014 | |

OTHER PUBLICATIONS

International Search Report and Written Opinion received for corresponding Patent Cooperation Treaty Application No. PCT/IB2015/051714, dated Aug. 14, 2015, 12 pages.
Extended European Search Report received for corresponding European Patent Application No. 15884451.4, dated Sep. 21, 2018, 8 pages.
"WLAN/3GPP Radio Interworking Impacts to Core Network for Discussion with SA2/CT1", 3GPP TSG-RAN WG2 Meeting #83bis, R2-133432, Agenda item: 5.1, AT&T, Oct. 7-11, 2013, 8 pages.
"Introduction of eSaMOG: Overall Description", SA WG2 Meeting #99, S2-133693, Current Version: 12.2.0, Alcatel-Lucent, Sep. 23-27, 2013, 14 pages.
Office Action for European Application No. 15884451.4 dated Jul. 3, 2019, 6 pages.
Office Action for Chinese Application No. 201580079705.X dated Oct. 29, 2019, 9 pages.

* cited by examiner

| Category | WNM Action | Dailog Token | Request Mode | Disassociation Timer | Validity Interval | BSS Termination Duration | Session Information URL | BSS Transition Candidate List Entries |
|---|---|---|---|---|---|---|---|---|
| 1 | 1 | 1 | 1 | 2 | 1 | 0 or 12 | variable | variable |

Figure 4

| Element ID | Length | BSSID | BSSID Information | Operating Class | Channel Number | PHY Type | Optional Subelements |
|---|---|---|---|---|---|---|---|
| 1 | 1 | 6 | 4 | 1 | 1 | 1 | variable |

Figure 5

| AP Reachability | Security | Key Scope | Capabilities | Mobility Domain | High Throughput | Very High Throughput | FTM | IP Preserved | Reserved |
|---|---|---|---|---|---|---|---|---|---|
| 2 | 1 | 1 | 6 | 1 | 1 | 1 | 1 | 1 | 17 |

Figure 6

| Element ID | Length | MDID | FT Capability and Policy |
|---|---|---|---|
| 1 | 1 | 2 | 1 |

Figure 7

| Fast BSS Transition over DS | Resource Request Protocol Capability | IP Preserved | Reserved |
|---|---|---|---|
| 1 | 1 | 1 | 5 |

Figure 8

METHOD AND APPARATUS FOR PROVIDING AN INDICATION REGARDING IP ADDRESS PRESERVATION FOLLOWING A TRANSFER INVOLVING A WIRELESS LOCAL AREA NETWORK

RELATED APPLICATION

This application was originally filed as PCT Application No. PCT/IB2015/051714 filed Mar. 9, 2015.

TECHNOLOGICAL FIELD

An example embodiment relates generally to support for a transfer from a basic service set (BSS) of a wireless local area network (WLAN) to another BSS or to a cellular data link and, more particularly, to a method, apparatus and computer program product for providing an indication in advance regarding the preservation of the internet protocol (IP) address of the user equipment following a transfer from the BSS of the WLAN.

BACKGROUND

User equipment, such as a mobile telephone, a tablet computer, a smartphone, a personal digital assistant (FDA) or the like, may be supported at different times by different types of networks including a WLAN, such as a Wi-Fi network, or a cellular network employing any one of several different radio access technologies (RATs), such as a second generation (2G) RAT, a third generation (3G) RAT, a long term evolution (LTE) RAT or the like. In cellular systems, the network generally has been involved with and directed the network selection and mobility decisions of the user equipment. In contrast, the user equipment has traditionally directed the WLAN network selection and mobility decisions. While permitting the user equipment to direct the WLAN network selections and mobility decisions has been workable while the WLANs are relatively small and the user equipment is mostly stationary or has a relatively low level of mobility, the utilization of WLANs by cellular and other network operators has introduced complexity regarding the role of the user equipment in network selections and mobility decisions.

In this regard, cellular and other network operators have begun to utilize WLANs to increase overall network capacity in conjunction with the cellular networks. As the operators of cellular or other networks generally control the usage of their networks, the cellular or other network operators also desire to control the network selections and mobility decisions of the user equipment that are supported by the WLANs that operate in conjunction with the cellular networks. As a result of the control exerted by cellular or other network operators relating to network selections and mobility decisions, additional requirements for the WLANs and the user equipment that utilize the WLANs are being created. In relation to 3$^{rd}$ Generation Partnership Project (3GPP)-Wi-Fi interworking, the Wi-Fi Alliance has formed a Multiband Operation (MBO) task group and an Optimized Connectivity Experience (OCE) task group. Both task groups aim to improve the user experience when utilizing a WLAN. In this regard, the MBO is working to control admission to the network and to load balance efficiently between the BSSs in the same network or different networks within the same service domain, while the OCE additionally intends to improve the efficiency in the air interface by reducing the number of management frames transmitted and speeding up both the initial connection set up and handovers between BSSs.

As the cellular network will at least partially direct the network selections and mobility decisions within a WLAN in instances in which the WLAN is deployed by a cellular or other network operator in conjunction with the cellular network, the user equipment may not have access to all of the information that would be useful to the user equipment in participating in the network selections and mobility decisions. As such, the resulting network selections and mobility decisions introduced by a cellular or other network operator may be less desirable, at least from the perspective of the user equipment.

BRIEF SUMMARY

A method, apparatus and computer program product are provided in accordance with an example embodiment in order to facilitate the transition of user equipment between basic service sets within a WLAN or from a basic service set within a WLAN to a cellular data link of a cellular network. In this regard, the method, apparatus and computer product of an example embodiment notify the user equipment as to whether the transfer to another basic service set or to a cellular data link is a candidate to preserve the IP address of the user equipment. As such, the user equipment is able to identify the basic service set or cellular data link, if any, to which the user equipment should be transferred based at least in part upon whether the IP address of the user equipment is able to be preserved, thereby permitting resulting transfer to be accomplished in a more efficient manner without the disruption that may otherwise occur with the assignment of a different IP address to the user equipment.

In an example embodiment, a method is provided that includes receiving a message identifying one or more basic service sets or cellular data links to which user equipment is potentially capable of transferring. For each basic service set or cellular data link, the method includes determining from the message whether the respective basic service set or cellular data link is a candidate to permit an internet protocol (IP) address of the user equipment to be preserved following the transfer. The method of this example embodiment includes an indication associated with each respective basic service set or cellular data link to identify whether the IP address of the user equipment is a candidate to be preserved following the transfer thereto.

The method of an example embodiment also identifies the basic service set or the cellular data link to which the user equipment is to transfer based at least partially upon whether the IP address of the user equipment is a candidate to be preserved following the transfer to the basic service set or to the cellular data link. The method of an example embodiment also includes causing the user equipment to scan for one or more basic service set to which the user equipment could transfer. In this example embodiment, the message is received in response to the scan.

The message of an example embodiment includes a frame that includes an information field having a subfield that provides the indication to identify whether the IP address of the user equipment is a candidate to be preserved following the transfer to the basic service set or to the cellular data link with which the information field is associated. The message of another example embodiment includes a frame that includes an information field having a mobility domain subfield. The mobility domain subfield provides an indication as to whether the basic service set or the cellular data link with which the information field is associated and the basic service set or the cellular data link with which the user equipment is currently associated are within the same mobility domain and also to provide an indication to identify whether the IP address of the user equipment is a candidate to be preserved following the transfer to the basic service set or the cellular data link with which the information field is associated.

In other example embodiment, a computer program product is provided that includes at least one-transitory computer-readable storage medium having computer-executable program code portions stored therein. The computer-executable program code portions include program code instructions configured to perform any of the foregoing methods.

In a further example embodiment, an apparatus is provided that includes at least one processor and at least one memory including computer program code with the at least one memory and the computer program code configured to, with the processor, cause the apparatus to at least receive a message identifying one or more basic service sets or cellular data links to which the user equipment is potentially capable of transferring. The at least one memory and the computer program code are also configured to, with the processor, cause the apparatus of this example embodiment to, for each basic service set or cellular data link, determine from the message whether the respective basic service set or cellular data link is a candidate to permit an internet protocol (IP) address of the user equipment to be preserved following the transfer. The message of this example embodiment includes an indication associated with each respective basic service set or cellular data link to identify whether the IP address of the user equipment is a candidate to be preserved following the transfer thereto.

In an example embodiment, the at least one memory and the computer program code are further configured to, with the processor, cause the apparatus to identify the basic service set or cellular data link to which the user equipment is to transfer based on at least partially upon whether the IP address of the user equipment is a candidate to be preserved following the transfer to the basic service set or cellular data link. The at least one memory and the computer program code are further configured to, with the processor, cause the apparatus of an example embodiment to cause the user equipment to scan for one or more basic service sets to which the user equipment could transfer. The message of this example embodiment is received in response to the scan.

The message of an example embodiment includes a frame that includes an information field having a subfield that provides the indication to identify whether the IP address of the user equipment is a candidate to be preserved following the transfer to the basic service set or to the cellular data link with which the information field is associated. The message of another example embodiment includes a frame that includes an information field having a mobility domain subfield that provides of an indication as to whether the basic service set or the cellular data link with which the information field is associated and the basic service set or the cellular data link with which the user equipment is currently associated are within the same mobility domain as well as an indication to identify whether the IP address of the user equipment is a candidate to be preserved following the transfer to the basic service set or the cellular data link with which the information field is associated.

In yet another example embodiment, an apparatus is provided that includes means for receiving a message identifying one or more basic service sets or cellular data links to which user equipment is potentially capable of transferring. The apparatus of this example embodiment also includes, for each basic service set or cellular data link, means for determining from the message whether the respective basic service set or cellular data link is a candidate to permit an internet protocol (IP) address of the user equipment to be preserved following the transfer. The message of this example embodiment includes an indication associated with each respective basic service set or cellular data link to identify whether the IP address (IP) of the user equipment is a candidate to be preserved following the transfer thereto.

In an example embodiment, a method is provided that includes identifying one or more basic service sets or cellular data links to which the user equipment is a candidate to transfer. For each basic service set or cellular data link, the method of this example embodiment includes determining whether the respective basic service set or cellular data link permits the internet protocol (IP) address of the user equipment to be preserved following the transfer. The method of this example embodiment also includes causing a message to be transmitted to the user equipment including an indication associated with each respective basic service set or cellular data link to identify whether the IP address of the user equipment is a candidate to be preserved following the transfer thereto.

The method of an example embodiment includes a frame that includes an information field having a subfield that provides the indication to identify whether the IP address of the user equipment is a candidate to be preserved following the transfer to the basic service set or to the cellular data link with which the information field is associated. The message of another example embodiment includes a frame that includes an information field having a mobility domain subfield that provides an indication as to whether the basic service set or the cellular data link with which the information field is associated and the basic service set or the cellular data link with which the user equipment is currently associated are within the same mobility domain as well as an indication to identify whether the IP address of the user equipment is a candidate to be preserved following the transfer to the basic service set or the cellular data link with which the information field is associated.

In another example embodiment, a computer program product is provided that includes at least one non-transitory computer-readable storage medium having computer-executable program code portions stored therein. The computer-executable program code portions include program code instructions configured to perform any of the foregoing methods.

In a further example embodiment, an apparatus is provided that includes at least one processor and at least one memory including computer program code with the at least one memory and the computer program code configured to, with the processor, cause the apparatus to at least identify one or more basic service sets or cellular data links to which the user equipment is potentially able to transfer. For each basic service set or cellular data link, the at least one memory and the computer program code are also configured to, with the processor, cause the apparatus of this example embodiment to determine whether the respective basic service set or cellular data link is a candidate to permit an internet protocol (IP) address for the user equipment to be preserved following the transfer. The at least one memory and the computer program code are also configured to, with the processor, cause the apparatus of this example embodiment to cause a message to be transmitted to the user equipment including an indication associated with each respective basic service set or cellular data link to identify whether the IP address of the user equipment is a candidate to be preserved following the transfer thereto.

The message of an example embodiment includes a frame that includes an information field having a subfield that provides the indication to identify whether the IP address of the user equipment is a candidate to be preserved following the transfer to the basic service set or to the cellular data link with which the information field is associated. The message of another example embodiment includes a frame that includes an information field having a mobility domain subfield that provides an indication as to whether the basic service set or the cellular data link with which the information field is associated and the basic service set or the cellular data link with which the user equipment is currently associated are within the same mobility domain as well as an indication to identify whether the IP address of the user equipment is a candidate to be preserved following the transfer to the basic service set or the cellular data link with which the information field is associated.

In yet another example embodiment, an apparatus is provided that includes means for identifying one or more basic service sets or cellular data links to which the user equipment is potentially able to transfer. For each basic service set or cellular data link, the apparatus of this example embodiment also includes means for determining whether the respective basic service set or cellular data link is a candidate to permit an internet protocol (IP) address of the user equipment to be preserved following the transfer. The method of this example embodiment also includes means for causing a message to be transmitted to the user equipment including an indication associated with each respective basic service set or cellular data link to identify whether the IP address of the user equipment is a candidate to be preserved following the transfer thereto.

BRIEF DESCRIPTION OF THE DRAWINGS

Figure 1:
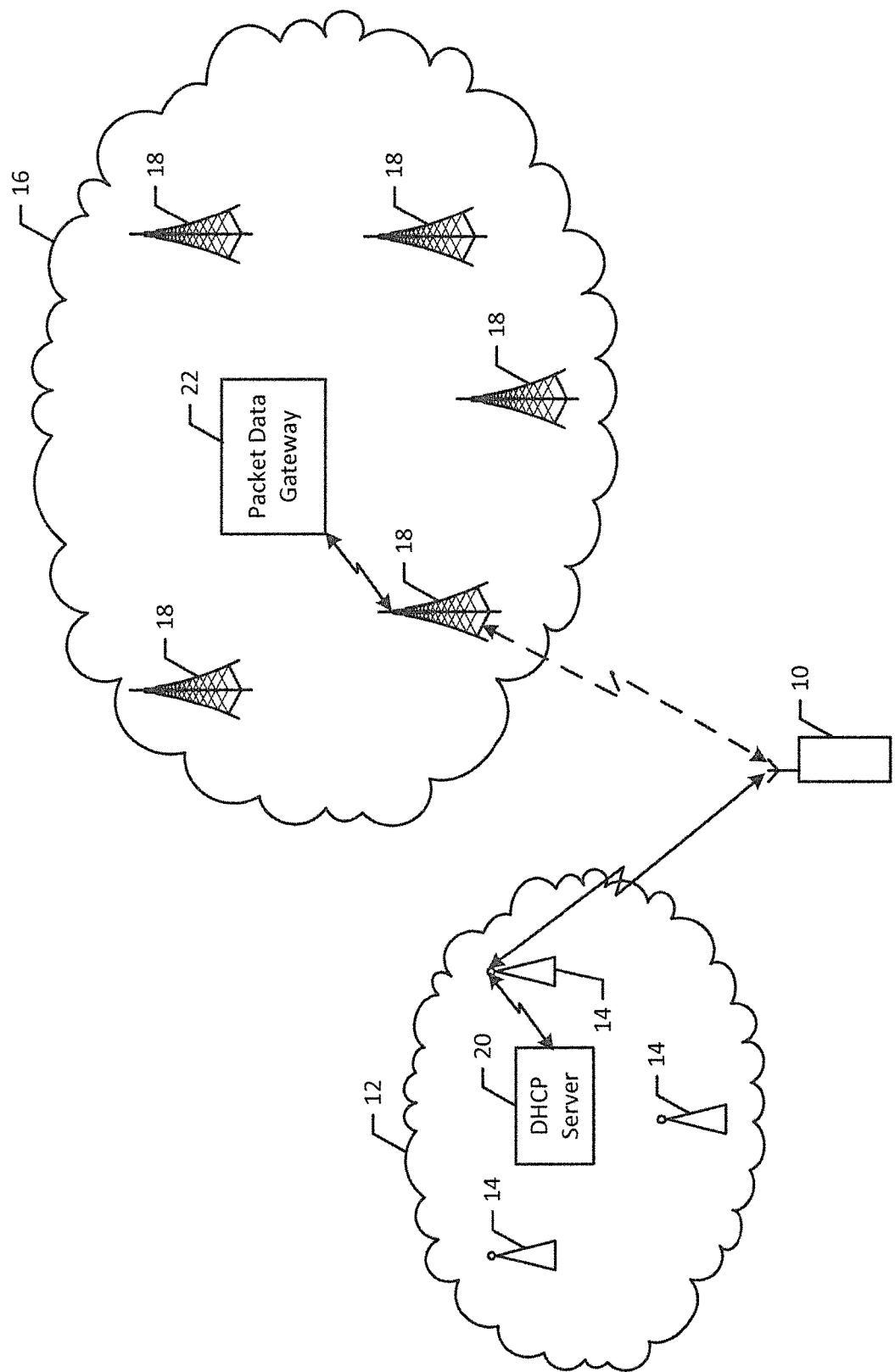
Figure 2:
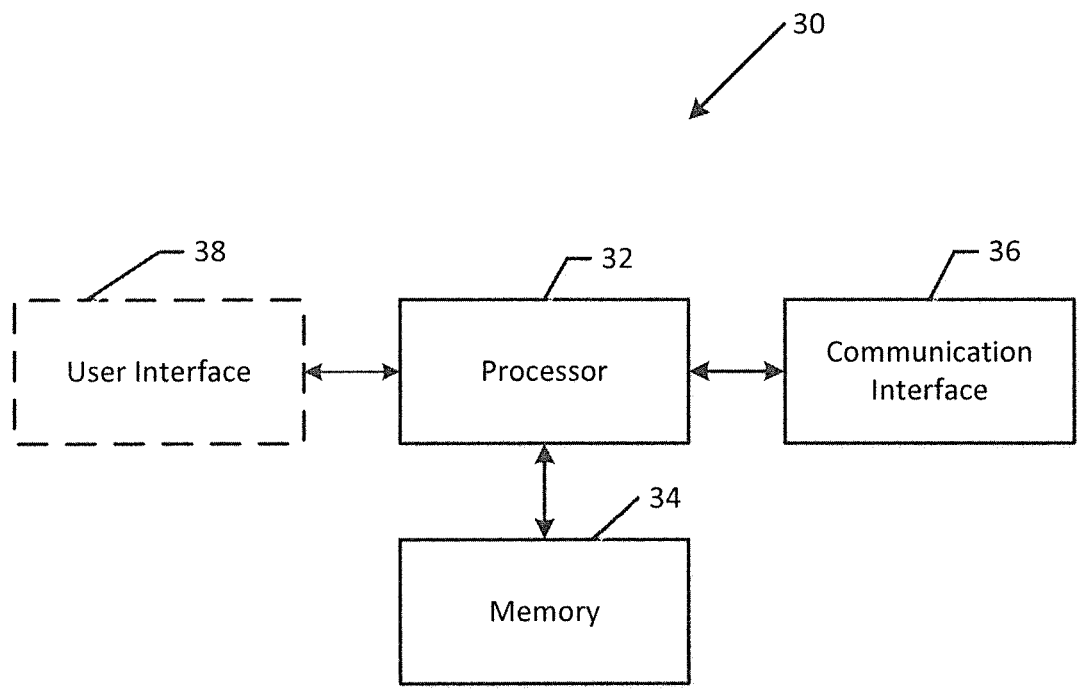
Figure 3:
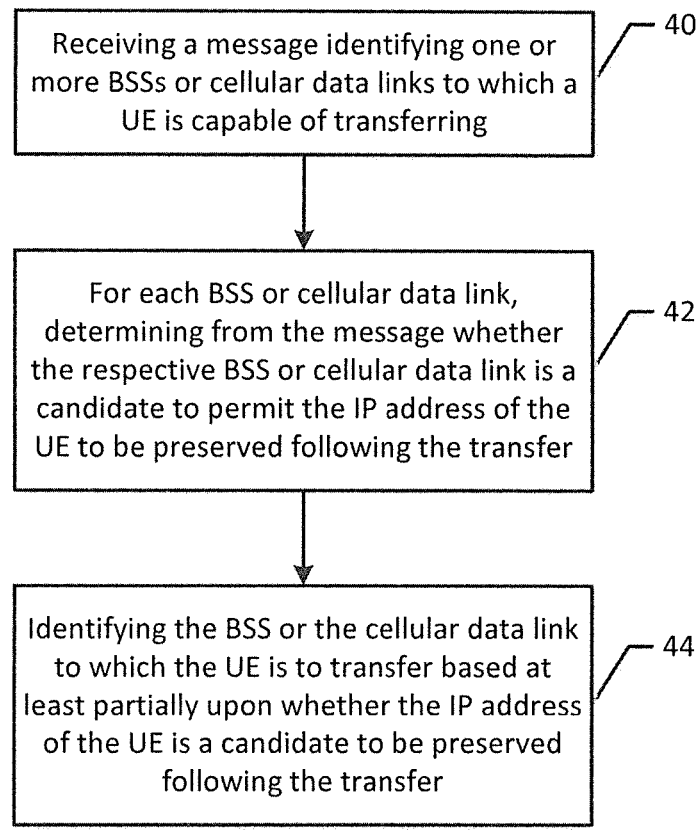
Figure 9:
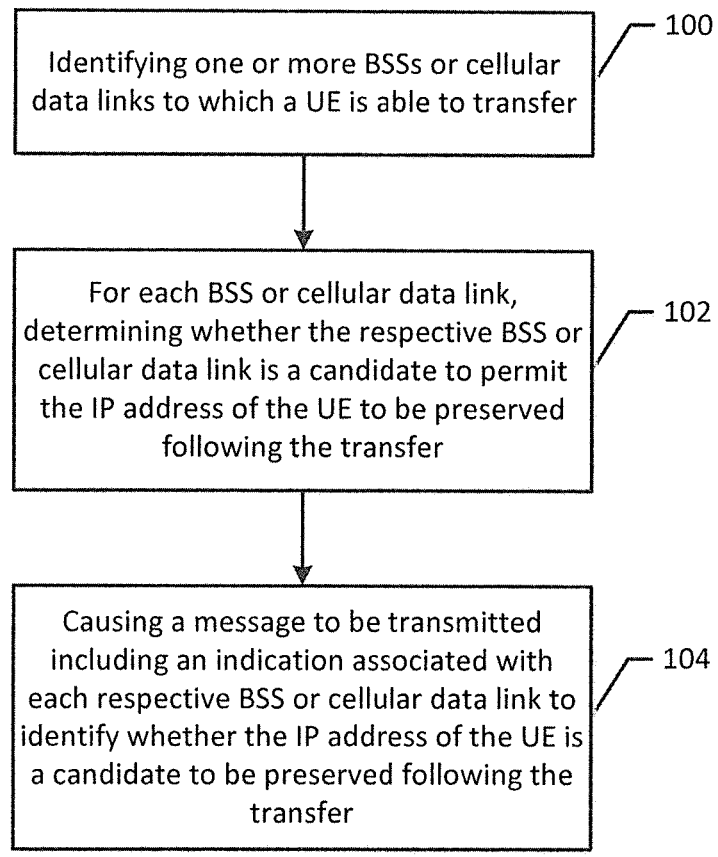

Having thus described certain example embodiments of the present invention in general terms, reference will hereinafter be made to the accompanying drawings which are not necessarily drawn to scale, and wherein:

FIG. 1 is a schematic representation of a system that includes a WLAN and a cellular network, each of which may support communications with the user equipment in accordance with an example embodiment of the present invention;

FIG. 2 is a block diagram of an apparatus that may alternately be embodied by the user equipment or by a network element and, in either instance, may be specifically configured in accordance with an example embodiment of the present invention;

FIG. 3 is a flowchart illustrating operations performed, such as by the apparatus of FIG. 2, in accordance with an example embodiment of the present invention;

FIG. 4 is a representation of a BSS transition management request frame;

FIG. 5 is a representation of a neighbor report element;

FIG. 6 is a representation of a BSS identification (BSSID) information field including an IP preserved subfield in accordance with an example embodiment of the present invention;

FIG. 7 is a representation of a mobility domain element;

FIG. 8 is a representation of the FT capability and policy field of the mobility domain element with an IP preserved subfield in accordance with an example embodiment of the present invention; and FIG. 9 is a flowchart of the operations performed, such as by the apparatus of FIG. 2, in accordance with another example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to provide the user equipment with information regarding whether the Internet protocol (IP) address of the user equipment is able to be preserved following the transfer of the user equipment from an access point of a WLAN to another BSS of the WLAN or to a cellular data link of a cellular network. Based upon the information regarding whether the IP address of the user equipment is able to be preserved following the transfer, the user equipment is able to make a more informed decision regarding the advisability of the transfer. In an instance in which the IP address is able to be preserved following the transfer, the user equipment may more readily permit the transfer to another BSS of the WLAN or to a cellular data link of the cellular network. However, in an instance in which the IP address of the user equipment will not be preserved and in which it is most efficient or otherwise desirable for the user equipment to maintain the same IP address, such as for facilitating continuity of communications or otherwise continuing to satisfy the requirements of the applications currently being executed by the user equipment, the user equipment may be less likely to transfer to another BSS of the WLAN or to a cellular data link of the cellular network and may, instead, decline the transfer so as to remain in communication with the same BSS with the same IP address. It is noted that the foregoing indication of IP address preservation from a transfer from the WLAN to a cellular network is based only network perception. The user equipment must also support such a functionality and not interrupt ongoing connections when a physical interface changes. The user equipment may therefore include, for example, one or more virtual device drivers to hide the physical interfaces from the applications.

As shown in FIG. 1, the user equipment 10 is capable of communicating with two or more different types of networks, such as a WLAN 12, such as a Wi-Fi network, and a cellular network 16, such as a 2G, 3G or LTE network. The user equipment may be embodied in various manners and, in one embodiment, is embodied as a mobile terminal, such as a personal digital assistant (PDA), mobile telephone, smart phone, companion device, for example, a smart watch, pager, mobile television, gaming device, laptop computer, camera, tablet computer, touch surface, video recorder, audio/video player, radio, electronic book or any combination of the aforementioned, and other types of voice and text communications systems. Alternatively, the computing device may be a fixed computing device, such as a personal computer, a computer workstation, a kiosk or the like.

The WLAN 12 includes a plurality of access points 14 that are configured to support communications with the user equipment 10 and to facilitate communications between the user equipment and the other networks, such as the cellular network 16. Each access point may include one or more BSSs. Each BSS indicates a service point in a WLAN to which the user equipment may connect to in order to have network access. As such, the method, apparatus and computer program product of an example embodiment of the present invention will be described in conjunction with the transfer from one BSS to another BSS. However, the method, apparatus and computer program product of another example embodiment could be described in regards to the transfer from one access point to another access point.

As described below, the WLAN 12 may also include one or more network elements, such as a dynamic host configuration protocol (DHCP) server 20, that are configured to allocate IP addresses to the user equipment in communication with the BSSs of the WLAN. Although the DHCP server is depicted so as to be separate from the access points, the DHCP server may alternatively be embodied by one of the access points or may be distributed amongst a plurality of access points. While the WLAN that is illustrated is shown to include a DHCP server, the WLAN of other example embodiments may include other network elements or additional network elements that are configured to assign IP addresses to the user equipment in communication with the BSSs.

The cellular network 16 may be any of a variety of different types of cellular networks operating in accordance with various RATs. For example, the cellular network may be a 1G network, a 2G network, a 3G network, an LTE network or the like. As shown, the cellular includes a plurality of base stations 18 for defining of plurality of cells to facilitate communications with the user equipment 10. The cellular network also includes one or more network elements, such as a packet data gateway 22 as depicted in FIG. 1, for allocating an IP address to the user equipment that accesses the cellular network. The packet data gateway may be embodied by a serving general packet radio service (GPRS) support node (SGSN), a packet data network (PDN) gateway or the like. Alternatively, the cellular network of other example embodiments may include additional network elements or alternative network elements for allocating the IP address to the user equipment access in the cellular network. For example, the same DHCP server could serve both the cellular users and the WLAN users in operator networks.

Referring now to FIG. 2, a block diagram of an apparatus 30 that may embody the user equipment 10 or a network element, such as the DHCP server 20, the packet data gateway 22 or the like, is depicted. In this regard, the apparatus includes, is associated with or is otherwise in communication with a processor 32, a memory device 34 and a communication interface 36. In an embodiment in which the apparatus is embodied by the user equipment, the apparatus may also include, be associated with or otherwise be in communication with a user interface 38.

In some embodiments, the processor 32 (and/or co-processors or any other processing circuitry assisting or otherwise associated with the processor) may be in communication with the memory device 34 via a bus for passing information among components of the apparatus 30. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 30 may be embodied by the user equipment 10 or a network element, such as the DHCP server 20, the packet data gateway 22 or the like. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 32 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 30 of an example embodiment also includes a communication interface 36 that may be any means such as a device or circuitry embodied in either hardware or a combination of hardware and software that is configured to receive and/or transmit data from/to other electronic devices in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

In an embodiment in which the apparatus 30 is embodied by the user equipment 10, the apparatus may also optionally include or otherwise be in communication with a user interface 38. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 32 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 34 and/or the like).

Referring now to FIG. 3, the operations performed, such as by the apparatus 30 of FIG. 2 as embodied by the user equipment 10, are illustrated. As show in block 40, the apparatus of an example embodiment includes means, such as the processor 32, the communication interface 36 or the like, for receiving a message identifying one or more BSSs or cellular data links to which the user equipment is capable of transferring. In this regard, the user equipment is currently supported by and in communication with a BSS of the WLAN 12, but the message may recommend or require that the user equipment transfer to another BSS of the WLAN or to a cellular data link of the cellular network 16. In this regard, the transfer of the user equipment to another BSS or to a cellular data link effects a handover or other transition of the user equipment so as to be supported by an in communication with the other BSS or the cellular data link in the future.

The message may be initiated by the network. In this regard, a network, such as the WLAN 12 or the cellular network 16, may have determined that the user equipment 10 should be required or recommended to transfer to another BSS or cellular data link, such as to receive more efficient or higher quality service, to balance the load amongst the various BSSs or cellular data links or for any of a wide variety of other reasons. Alternatively, the user equipment may have initiated the inquiry regarding the BSSs or cellular data links to which the user equipment could transfer, such as in an effort to obtain a higher quality service.

Regardless of whether the message identifying one or more BSSs or cellular data links to which the user equipment 10 may be capable of transferring is initiated by the network or by the user equipment, the user equipment receives the message identifying the one or more BSSs or cellular data links to which the user equipment is capable of transferring, as shown in block 40 of FIG. 3. With respect to the BSSs, the user equipment would be serviced by a different BSS within the same WLAN 12 following the transfer. With respect to the cellular data links, however, the user equipment that transfers to a cellular data link would thereafter be supported, not by a BSS of the WLAN, but by a cellular data link of the cellular network 16.

As shown in block 42 of FIG. 3, the apparatus 30 as embodied by the user equipment 10 includes means, such as the processor 32 or the like, for determining from the message whether a respective BSS or cellular data link is a candidate to permit the IP address of the user equipment to be preserved following the transfer to the respective BSS or the cellular data link. As noted above, the message may identify one or a plurality of BSSs or cellular data links to which the user equipment is capable of transferring. As such, the apparatus, such as the processor, determines, for each BSS or cellular data link to which the user equipment is capable of transferring, whether the respective BSS or cellular data link is a candidate to permit the IP address of the user equipment to be preserved following the transfer.

The apparatus 30 as embodied by the user equipment 10 also includes means, such as the processor 32 or the like, for identifying the BSS or the cellular data link to which the user equipment is to transfer based at least partially upon whether the IP address of the user equipment is a candidate to be preserved following the transfer. See block 44 of FIG. 3. For example, in those instances in which the preservation of the IP address of the user equipment following the transfer is important, valued or otherwise weighted highly for purposes of efficiency, continuity of communications or for any of a myriad of other reasons, the apparatus, such as the processor, is configured to preferentially identify a BSS or cellular data link to which the user equipment is to transfer from among the BSSs or cellular data links that are candidates to permit the IP address of the user equipment to be preserved following the transfer and to only identify a BSS or cellular data link to which the user equipment is to transfer that does not permit the IP address of the user equipment to be preserved following the transfer in an instance in which none of the BSSs or the cellular data links to which the user equipment is capable of transferring permits the IP address of the user equipment to be preserved following the transfer.

In regards to a BSS or a cellular data link being a candidate to permit the IP address of the user equipment 10 to be preserved, the user equipment may be configured to validate the IP address validity of a BSS or cellular data link, such as with the DHCP server 20. This validation either confirms that the IP address of the user equipment will be preserved or indicates that the IP address of the user equipment will not, in fact, be preserved following the transfer. In an example embodiment, an IP address preservation flag may be provided in the message received by the user equipment, such as within the subfield of the BSS transition management frame or the generic advertisement service frame described below. The IP address preservation flag associated with a respective BSS or cellular data link may indicate that the IP address of the user equipment will not be preserved following the transfer, is a candidate to be preserved subject to validation by the user equipment or will be preserved, such as in an instance in which the user equipment is already engaged in the same WLAN as that in which the target BSS resides.

The message that is received by the apparatus 30, such as the processor 32, the communication interface 36 or the like, as embodied by the user equipment 10 can have a variety of formats. By way of example, the message may be embodied by a BSS transition management frame and/or generic advertisement service frame that may be transmitted by the access point 14 with which the user equipment is currently in communication on behalf of a network element, such as the packet data gateway 22 of the cellular network 16 or the DHCP server 20 of the WLAN 12 in order to direct the user equipment to transfer from the BSS with which the user equipment is currently in communication to another BSS within the WLAN or to a cellular data link in the cellular network. The BSS transition management frames and the generic advertisement service frames both contain a list of one or more BSSs or cellular data links with an indication, such as by the ordering of the BSSs or the cellular data links, as to the preference from the network perspective as to the BSS or the cellular data link to which the user equipment is to transfer. It is noted that the foregoing frames are provided by way of example and not of limitation as any other WLAN frame type could instead be utilized, such as dedicated Wireless Network Management (WNM)-Notification frames.

In order to provide an indication as to whether each respective BSS or the cellular data link identified by the BSS transition management frame or the generic advertisement service frame is a candidate to permit the IP address of the user equipment 10 to be preserved following the transfer, the BSS transition management frame or the generic advertisement service frame may include a subfield associated with each of the BSSs or the cellular data links that are identified as candidates to which the user equipment could transfer. The subfield provides an indication as to whether the respective BSS or the cellular data link permits the IP address of the user equipment to be preserved following the transfer.

As a more specific example, a BSS transition management request frame utilizes the action frame body format and the BSS transition management request action field format as defined by sections 10.24.7 and 8.6.14.9 of the IEEE 802.11 REVmc_D3.3 as shown in FIG. 4. In this regard, FIG. 4 depicts an example of a BSS transition management request frame 50 and its constituent fields. An indication is provided below each field of the number of octets reserved for the respective field in this example embodiment. Among the plurality of fields, the BSS transition management request frame includes a field for the BSS transition candidate list entries. The field for the BSS transition candidate list entries includes information on zero or more access points within the extended service set (ESS) to which the user equipment is recommended to associate.

In an example embodiment, the information regarding the BSSs provided by the BSS transition candidate list entries field is provided by a neighbor report element 60 as defined by section 8.4.2.36 of the IEEE 802.11 REVmc_D3.3 and as shown in FIG. 5. A separate neighbor report element may be provided for each target network, as defined by the BSSID and supported by the information regarding whether the user equipment can locate the target network. The neighbor report element of FIG. 5 also includes a plurality of fields along with an indication of the number of octets reserved for each field. One of the fields of the neighbor report element is the BSSID information field. The BSSID information field 70 is depicted in FIG. 6. The BSSID information field includes a plurality of subfields as shown in FIG. 6 along with a numerical indication of the number of bits reserved for each subfield.

As shown in FIG. 6, the BSSID information field 70 may include a subfield designated IP Preserved that provides an indication as to whether the respective BSS or the cellular data link with which the BSSID information field is associated is a candidate to permit the IP address of the user equipment 10 to be preserved following a transfer to the respective BSS or the cellular data link. Although the IP Preserved subfield may be of any size, the IP Preserved subfield of an example embodiment may be a single bit that may be set to a first predefined value, such as 1, to indicate that the respective BSS or the cellular data link associated with the BSSID information field is a candidate to preserve the IP address of the user equipment following a transfer thereto, and to be set to a second predefined value, such as 0, to indicate that the respective BSS or the cellular data link associated with the BSSID information field is unable to preserve the IP address of the user equipment following transfer of the user equipment thereto.

As also shown in FIG. 6, the BSSID information field 70 may also include a mobility domain subfield. The mobility domain subfield may include a bit that may set to a first predefined value, such as 1, to indicate that the BSS or the cellular data link with which the BSSID information field is associated belongs to the same mobility domain, that is a set of BSSs within the same ESS, as the BSS with which the user equipment 10 is currently in communication, such as the BSS which transmitted the BSS transition management request frame 50. In another example embodiment, the mobility domain subfield of the BSSID information field may be utilized to indicate whether the BSS or the cellular data link with which the BSSID information field is associated is a candidate to permit the IP address of the user equipment to be preserved following a transfer thereto. For example, the mobility domain subfield may be set to a first predefined value, such as 1, to not only indicate that the access point with which the BSSID information field is associated belongs to the same mobility domain as the BSS with which the user equipment is currently in communication, but to also indicate that the BSS or the cellular data link with which the BSSID information field is associated is a candidate to permit the IP address of the user equipment to be preserved. Conversely, the mobility domain subfield may be set to a second predefined value, such as 0, to indicate either that the BSS with which the BSSID information field is associated is not in the same mobility domain as the BSS with which the user equipment is currently in communication and/or to indicate that the BSS or the cellular data link with which the BSSID information field is associated is unable to preserve the IP address of the user equipment following a transfer to the respective BSS or cellular data link. It is noted that the mobility domain supplement is not necessary if the forwarding WLAN is aware that the user equipment 10 is currently engaged with an IP address of a domain which can be preserved following the transfer, e.g., handover.

As noted above, a network element, such as a packet data gateway 22 of the cellular network 16 or the DHCP server 20 of the WLAN 12, is able to initiate the transfer of a message to the user equipment 10 identifying one or more BSSs or cellular data links to which the user equipment is capable of transferring, such as either in the form of a recommendation that the user equipment transfer to a respective one of the BSSs or the cellular data links. Alternatively, the apparatus embodied by the user equipment includes means, such as the processor 32, the communication interface 36 or the like, for causing the user equipment to scan for one or more BSSs to which the user equipment could transfer. In this alternative embodiment, the messages received from the network, such as the DHCP server of the WLAN, are in response to the scan. As such, the user equipment in this alternative embodiment initiates the message transmitted by the network that identifies one or more BSSs or cellular data links to which the user equipment is capable of transferring. The user equipment may be configured to scan for candidate BSSs to which the user equipment could transfer for various reasons including in instances in which the user equipment is not in a position so as to receive a BSS transition management request frame 50 from the network.

In an embodiment in which the user equipment 10 scans to identify the BSS to which the user equipment could transfer, the user equipment and the network may communicate with beacon and probe response frames. In the message received from the network, such as a probe response frame, of this example embodiment, one or more mobility domain elements 80 may be provided as shown in FIG. 7 with each mobility domain element associated with a respective BSS of an access point of the WLAN 12 to which the user equipment is capable of transferring. In this regard, FIG. 7 depicts the fields of the mobility domain element along with an indication of the number of octets reserved for each field. As shown in FIG. 7, the mobility domain element of this example embodiment includes an FT capability and policy field. The FT capability and policy field provides an indication as to whether the BSS is supported by an access point that is a member of a group of access points that constitute a mobility domain. In accordance with an example embodiment, one or more of the bits of the FT capability and policy field of the mobility domain element may serve as an indication as to whether the IP address of the user equipment is a candidate to be preserved following the transfer to the BSS of an access point with which the mobility domain element is associated. In this regard, an example of the FT capability and policy field 90 is depicted in FIG. 8 with the FT capability and policy field including an IP preserved subfield that may be set to a first predefined value, such as 1, to indicate that IP address of the user equipment is a candidate to be preserved following a transfer to the BSS of an access point with which the mobility domain element is associated and that may be set to a second predefined value, such as 0, to indicate that the IP address of the user equipment will not be preserved following a transfer to the BSS of an access point with which the mobility domain element is associated.

As also noted above, the message received by the user equipment 10 may not only indicate one or more BSSs to which the user equipment is able to transfer, but one or more cellular data links of the cellular network, such as defined by the public land mobile network (PLMN) and access point name (APN) of the respective cellular network, to which the user equipment is able to transfer. In this regard, BSS transition management request frame 50 may identify one or more BSSs as well as one or more cellular data links to which the user equipment is able to transfer. In an instance in which the BSS transition management request frame identifies one or more cellular data links to which the user equipment is able to transfer, the BSS transition management request frame may identify the respective cellular data links in various manners.

For example, the BSS transition management request frame 50 may identify a respective cellular data link by a cellular data link request element, one of which is included in the BSS transition management request frame for each cellular data link to which the user equipment 10 is able to transfer. The cellular data link request element of this example embodiment may include an element identity (ID), that is, an IEEE 802.11 vendor specific information element, a length field defining the length of the other fields in the information element in octets, an organizationally unique identifier (OUI) field defining the Wi-Fi Alliance (WFA) specific OUI, an OUI type field identifying the type and version of the information element, a cellular data link transition request field having a first predefined value, such as a value of 1, to indicate to the user equipment that the BSS with which the user equipment is currently communicating wants to move the traffic associated with the user equipment to the cellular data link and a second predefined value, such as a value of 0, to indicate that the BSS with which the user equipment is currently in communication prefers for the user equipment to remain in the same ESS, and an optional cellular data link preference field which is provided in an instance in which the cellular data link transition request field has the first predefined value indicating that the user equipment should transfer to the cellular data link and which provides an indication as to the preference level for the transition to the cellular data link.

In another embodiment, the message includes a request frame that includes an information field having a PLMN subfield. The PLMN subfield identifies PLMNs and optionally APNs for which an IP address preservation can be provided. The PLMN subfield can be combined with the mobility domain subfield to indicate the mobility domains from which IP address preservation can be made for a cellular network.

In accordance with an example embodiment, the cellular data link request element also includes an indication as to whether the IP address of the user equipment 10 is a candidate to be preserved following a transition to the respective cellular data link. For example, this indication may be provided as an additional field within the cellular data link request element. The IP preserved field may be set to a first predefined value, such as a value of 1, to indicate that the IP address is a candidate to be preserved following transition of the user equipment to the respective cellular data link and may have a second predefined value, such as a value of 0, to indicate that the IP address will not be preserved following a transfer of the user equipment to the respective cellular data link.

By providing information regarding the preservation of the IP address of the user equipment 10 following a transfer to a respective BSS or cellular data link, the user equipment is able to more intelligently determine the BSS or the cellular data link, if any, to which the user equipment should transfer. In this regard, the user equipment is configured to weight the importance of the preservation of the IP address of the user equipment in the determination as to whether the user equipment should transfer to another BSS or the cellular data link and, if so, which BSS or the cellular data link to which the user equipment should transfer based at least in part upon whether the IP address of the user equipment will be preserved thereafter.

Referring now to FIG. 9, the operations performed by an apparatus 30 as embodied by a network element in conjunction with the provision of information regarding whether the IP address of the user equipment 10 is a candidate to be preserved following a transfer to another BSS or the cellular data link is provided. In this regard, the network element may be embodied by any one or more of a plurality of network devices. For example, the network element may be embodied by a packet data gateway 22, such as an SGSN or PDN gateway of the cellular network 16. Additionally or alternatively, the network element may be embodied by a DHCP server 20 of the WLAN 12 which may, in turn, be embodied by one more of the access points 14. In an embodiment in which the Wi-Fi access provided by the WLAN is integrated with the cellular packet core, the packet data gateway of the cellular network may provide for allocation of not only cellular data links, but also BSSs of the WLAN.

As shown in block 100 of FIG. 9, the apparatus 30 as embodied by the network element includes means, such as the processor 32 or the like, for identifying one or more BSSs or cellular data links which the user equipment 10 is able to transfer. As noted above, the network element may initiate the communication with the user equipment regarding the potential transfer to another BSS or the cellular data link. For example, the network element may initiate the communication with the user equipment regarding a possible transfer based upon various considerations, such as the efficiency with which the user equipment is communicating with its current BSS, load balancing considerations for the network or the like. Alternatively, the network element may be responsive to a scan by the user equipment that requests information regarding one or more BSSs to which the user equipment is able to transfer.

For each BSS or the cellular data link identified by the network element as a candidate to which the user equipment 10 is able to transfer, the apparatus 30 as embodied by the network element also includes means, such as the processor 32 or the like, for determining whether the respective BSS or the cellular data link is a candidate to permit the IP address of the user equipment to be preserved following the transfer. See block 102 of FIG. 9. The network element may determine whether the respective BSS or the cellular data link is a candidate to permit the IP address of the user equipment to be preserved following a transfer in various manners. For example, the network element may include or have access to predefined information that identifies, for each BSS or the cellular data link, whether the respective BSS or the cellular data link is a candidate to permit the IP address of the user equipment to be preserved following a transfer thereto. Alternatively, the network including the network element may have learned from past experience, such as in the context of a self-organizing network (SON), whether the respective BSS or the cellular data link is a candidate to permit the IP address of the user equipment to be preserved following a transfer thereto.

The apparatus 30 as embodied by the network element also includes means, such as the processor 32, the communication interface 36 or the like, for causing the message to be transmitted to the user equipment 10 including an indication associated with each respective BSS or the cellular data link to identify whether the IP address of the user equipment is a candidate to be preserved following a transfer to the respective BSS or the cellular data link. See block 104 of FIG. 9. As described above, the message may be formatted in a variety of different manners while providing the indication to the user equipment as to whether each respective BSS or the cellular data link is a candidate to preserve the IP address of the user equipment following a transfer thereto.

FIGS. 3 and 9 illustrate flowcharts of an apparatus 30, method and computer program product according to example embodiments of the invention from the perspective of the user equipment 10 and a network element, such as the DHCP server 20 or the packet data gateway 22, respectively. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present invention and executed by a processor 32 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving a message identifying a plurality of basic service sets or cellular data links to which a user equipment is potentially capable of transferring;
    for each basic service set or cellular data link of the plurality of basic service sets or cellular data links, determining from the message whether each respective basic service set or cellular data link is a candidate to permit an internet protocol (IP) address of the user equipment to be preserved following the transfer;
    identifying one or more basic service sets or cellular data links of the plurality of basic service sets or cellular data links to which the user equipment is allowed to transfer while preserving the IP address of the user equipment; and
    validating, using the user equipment or a dynamic host configuration protocol server, that the IP address of the user equipment will be preserved following the transfer to the one or more basic service sets or cellular data links,
    wherein the message comprises a frame that includes an information field having a mobility domain subfield that provides:
        an indication as to whether the one or more basic service sets or cellular data links of the plurality of basic service sets or cellular data links with which the information field is associated and an existing basic service set or cellular data link of the plurality of basic service sets or cellular data links with which the user equipment is currently associated are within a same mobility domain; and
        an indication to identify whether the IP address of the user equipment is a candidate to be preserved following the transfer to one of the one or more basic service sets or cellular data links of the plurality of basic service sets or cellular data links to which the user equipment is allowed to transfer while preserving the IP address of the user equipment and with which the information field is associated.

2. The method according to claim 1 further comprising identifying a suggested basic service set or cellular data link of the plurality of basic service sets or cellular data links to which the user equipment is allowed to transfer while preserving the IP address of the user equipment.

3. The method according to claim 1 wherein the message comprises a frame that includes an information field having a subfield that provides the indication to identify whether the IP address of the user equipment is a candidate to be preserved following the transfer to one or more basic service sets or cellular data links of the plurality of basic service sets or cellular data links to which the user equipment is allowed to transfer while preserving the IP address of the user equipment and with which the information field is associated.

4. The method according to claim 1 further comprising causing the user equipment to scan for the plurality of basic service sets or cellular data links to which the user equipment could transfer, wherein the message is received in response to the scan.

5. An apparatus comprising at least one processor and at least one memory including computer program code, the at least one memory and computer program code configured to, with the processor, cause the apparatus to at least:
    receive a message identifying a plurality of basic service sets or cellular data links to which a user equipment is potentially capable of transferring;
    for each basic service set or cellular data link of the plurality of basic service sets or cellular data links, determine from the message whether each respective basic service set or cellular data link is a candidate to permit an internet protocol (IP) address of the user equipment to be preserved following the transfer;
    identify one or more basic service sets or cellular data links of the plurality of basic service sets or cellular data links to which the user equipment is allowed to transfer while preserving the IP address of the user equipment; and
    validate, using the user equipment or a dynamic host configuration protocol server, that the IP address of the user equipment will be preserved following the transfer to the one or more basic service sets or cellular data links,
    wherein the message comprises a frame that includes an information field having a mobility domain subfield that provides:
        an indication as to whether the one or more basic service sets or cellular data links of the plurality of basic service sets or cellular data links with which the information field is associated and an existing basic service set or cellular data link of the plurality of basic service sets or cellular data links with which the user equipment is currently associated are within a same mobility domain; and
        an indication to identify whether the IP address of the user equipment is a candidate to be preserved following the transfer to one of the one or more basic service sets or cellular data links of the plurality of basic service sets or cellular data links to which the user equipment is allowed to transfer while preserving the IP address of the user equipment and with which the information field is associated.

6. The apparatus according to claim 5 wherein the at least one memory and computer program code are further configured to, with the processor, cause the apparatus to identify a suggested basic service set or cellular data link of the plurality of basic service sets or cellular data links to which the user equipment is allowed to transfer while preserving the IP address of the user equipment.

7. The apparatus according to claim 5 wherein the message comprises a frame that includes an information field having a subfield that provides the indication to identify whether the IP address of the user equipment is a candidate to be preserved following the transfer to one or more basic service sets or cellular data links of the plurality of basic service sets or cellular data links to which the user equipment is allowed to transfer while preserving the IP address of the user equipment and with which the information field is associated.

8. The apparatus according to claim 5 wherein the at least one memory and computer program code are further configured to, with the processor, cause the apparatus to cause the user equipment to scan for the plurality of basic service sets or cellular data links to which the user equipment could transfer, wherein the message is received in response to the scan.

9. A method comprising:
identifying a plurality of basic service sets or cellular data links to which a user equipment is potentially able to transfer;
determining whether each basic service set or cellular data link of the plurality of basic service sets or cellular data links is a candidate to permit an internet protocol (IP) address of the user equipment to be preserved following the transfer;
identifying one or more basic service sets or cellular data links of the plurality of basic service sets or cellular data links to which the user equipment is allowed to transfer while preserving the IP address of the user equipment;
causing a message to be transmitted to the user equipment including an indication associated with each respective basic service set or cellular data link to identify whether the IP address of the user equipment is a candidate to be preserved following the transfer thereto; and
causing validation, by a dynamic host configuration protocol server, that the IP address of the user equipment will be preserved following the transfer to the one or more basic service sets or cellular data links.

10. The method according to claim 9 wherein the message comprises a frame that includes an information field having a subfield that provides the indication to identify whether the IP address of the user equipment is a candidate to be preserved following the transfer to one or more basic service sets or cellular data links of the plurality of basic service sets or cellular data links to which the user equipment is allowed to transfer while preserving the IP address of the user equipment with which the information field is associated.

11. The method according to claim 9 wherein the message comprises a frame that includes an information field having a mobility domain subfield that provides: (i) an indication as to whether the one or more basic service sets or cellular data links of the plurality of basic service sets or cellular data links with which the information field is associated and an existing basic service set or cellular data link with which the user equipment is currently associated are within a same mobility domain and (ii) an indication to identify whether the IP address of the user equipment is a candidate to be preserved following the transfer to one of the one or more basic service sets or cellular data links of the plurality of basic service sets or cellular data links to which the user equipment is allowed to transfer while preserving the IP address of the user equipment and with which the information field is associated.

12. An apparatus comprising at least one processor and at least one memory including computer program code, the at least one memory and computer program code configured to, with the processor, cause the apparatus to at least:
identify a plurality of basic service sets or cellular data links to which a user equipment is potentially able to transfer;
determine whether each basic service set or cellular data link of the plurality of basic service sets or cellular data links is a candidate to permit an internet protocol (IP) address of the user equipment to be preserved following the transfer;
identify one or more basic service sets or cellular data links of the plurality of basic service sets or cellular data links to which the user equipment is allowed to transfer while preserving the IP address of the user equipment;
cause a message to be transmitted to the user equipment including an indication associated with each respective basic service set or cellular data link to identify whether the IP address of the user equipment is a candidate to be preserved following the transfer thereto; and
cause validation, by a dynamic host configuration protocol server, that the IP address of the user equipment will be preserved following the transfer to the one or more basic service sets or cellular data links.

13. The apparatus according to claim 12 wherein the message comprises a frame that includes an information field having a subfield that provides the indication to identify whether the IP address of the user equipment is a candidate to be preserved following the transfer to one or more basic service sets or cellular data links of the plurality of basic service sets or cellular data links to which the user equipment is allowed to transfer while preserving the IP address of the user equipment and with which the information field is associated.

14. The apparatus according to claim 12 wherein the message comprises a frame that includes an information field having a mobility domain subfield that provides: (i) an indication as to whether the one or more basic service sets or cellular data links of the plurality of basic service sets or cellular data links with which the information field is associated and an existing basic service set or cellular data link with which the user equipment is currently associated are within a same mobility domain and (ii) an indication to identify whether the IP address of the user equipment is a candidate to be preserved following the transfer to one of the one or more basic service sets or cellular data links of the plurality of basic service sets or cellular data links to which the user equipment is allowed to transfer while preserving the IP address of the user equipment and with which the information field is associated.

* * * * *